United States Patent
Bull et al.

(10) Patent No.: US 11,144,579 B2
(45) Date of Patent: Oct. 12, 2021

(54) USE OF MACHINE LEARNING TO CHARACTERIZE REFERENCE RELATIONSHIP APPLIED OVER A CITATION GRAPH

(71) Applicant: International Business Machines Corporation, Armonk, NY (US)

(72) Inventors: Brendan Bull, Durham, NC (US); Andrew Hicks, Durham, NC (US); Scott Robert Carrier, Apex, NC (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 16/272,239

(22) Filed: Feb. 11, 2019

(65) Prior Publication Data

US 2020/0257709 A1 Aug. 13, 2020

(51) Int. Cl.
*G06F 16/31* (2019.01)
*G06F 16/93* (2019.01)
*G06N 20/00* (2019.01)
*G06F 16/35* (2019.01)

(52) U.S. Cl.
CPC ............ *G06F 16/31* (2019.01); *G06F 16/353* (2019.01); *G06F 16/93* (2019.01); *G06N 20/00* (2019.01)

(58) Field of Classification Search
CPC ...... G06F 6/353; G06F 16/31; G06F 16/3347; G06F 16/93; G06N 20/00; G06N 3/084
USPC ........................................................ 707/741
See application file for complete search history.

(56) References Cited

U.S. PATENT DOCUMENTS

| | | | | |
|---|---|---|---|---|
| 5,983,171 | A * | 11/1999 | Yokoyama | G06F 16/319 704/10 |
| 7,996,379 | B1 * | 8/2011 | Jain | G06F 16/951 707/706 |
| 8,190,625 | B1 * | 5/2012 | Beach | G06F 16/94 707/765 |
| 8,489,587 | B2 | 7/2013 | Kemp | |
| 8,856,123 | B1 * | 10/2014 | Forman | G06F 16/31 707/737 |

(Continued)

OTHER PUBLICATIONS

Athar, Awais, and Simone Teufel. "Context-enhanced citation sentiment detection." Proceedings of the 2012 conference of the North American chapter of the Association for Computational Linguistics: Human language technologies. Association for Computational Linguistics, 2012.

(Continued)

*Primary Examiner* — Shahid A Alam
(74) *Attorney, Agent, or Firm* — Patterson + Sheridan, LLP

(57) ABSTRACT

Techniques for document analysis using machine learning are provided. A selection of an index is received document, and a plurality of documents that refer to the index document is identified. For each respective document in the plurality of documents, a respective portion of the respective document is extracted, where the respective portion refers to the index document, and a respective vector representation is generated for the respective portion. A plurality of groupings is generated for the plurality of documents based on how each of the plurality of documents relate to the index document, by processing the vector representations using a trained classifier. Finally, at least an indication of the plurality of groupings is provided, along with the index document.

20 Claims, 6 Drawing Sheets

(56) References Cited

U.S. PATENT DOCUMENTS

| | | | |
|---|---|---|---|
| 9,075,873 | B2 | 7/2015 | Vanderwende et al. |
| 9,098,501 | B2* | 8/2015 | Dean .................. G06F 16/951 |
| 9,201,969 | B2 | 12/2015 | Zhang et al. |
| 9,239,884 | B2 | 1/2016 | Carroll |
| 9,892,367 | B2 | 2/2018 | Guo et al. |
| 9,916,365 | B1 | 3/2018 | Dick et al. |
| 2004/0024739 | A1* | 2/2004 | Copperman .......... G06F 16/353 |
| 2006/0036614 | A1* | 2/2006 | Simske .................. G06F 16/35 |
| 2007/0239704 | A1 | 10/2007 | Burns et al. |
| 2008/0133476 | A1 | 6/2008 | Welch |
| 2008/0281764 | A1* | 11/2008 | Baxter .................. G06K 9/629 706/12 |
| 2010/0017388 | A1* | 1/2010 | Glover ............... G06F 16/9535 707/E17.001 |
| 2011/0022941 | A1* | 1/2011 | Osborne ............... G06F 16/367 715/230 |
| 2011/0099184 | A1* | 4/2011 | Symington ............. G06F 16/34 707/755 |
| 2012/0011428 | A1* | 1/2012 | Chisholm ............. G06F 16/313 715/230 |
| 2012/0130997 | A1* | 5/2012 | Risvik ............... G06F 16/24578 707/723 |
| 2012/0239637 | A9 | 9/2012 | Prakash et al. |
| 2012/0278341 | A1* | 11/2012 | ogilvy .................. G06F 16/313 707/749 |
| 2013/0346900 | A1 | 12/2013 | Matejka et al. |
| 2016/0335257 | A1 | 11/2016 | Janssens |
| 2016/0342591 | A1 | 11/2016 | Zholudev et al. |

OTHER PUBLICATIONS

Athar, Awais, and Simone Teufel. "Detection of implicit citations for sentiment detection." Proceedings of the Workshop on Detecting Structure in Scholarly Discourse. Association for Computational Linguistics, 2012.

Boyack, Kevin W., Henry Small, and Richard Klavans. "Improving the accuracy of co-citation clustering using full text." Journal of the Association for Information Science and Technology 64.9 (2013): 1759-1767.

Small, Henry. "Interpreting maps of science using citation context sentiments: a preliminary investigation." Scientometrics 87.2 (2011): 373-388.

Liu, Shengbo, et al. "Literature retrieval based on citation context" Scientometrics 101.2 (2014): 1293-1307.

Eom Y-H, Fortunato S (2011) Characterizing and Modeling Citation Dynamics. PLoS ONE 6(9): e24926. doi:10.1371/journal.pone.0024926.

Wang F, Wang X, Yang S (2017) Mining author relationship in scholarly networks based on tripartite citation analysis. PLoS ONE 12(11): e0187653. https://doi.org/10.1371/journal. pone.0187653.

Ludmila Marian, "Ranking Scientific Publications Based on Their Citation Graph," Ecole Polytechnique Federale de Lausanne Computer Science Department Master Thesis, CERN-THESIS-2009-029.

Ulrich Schafer and Uwe Kasterka, "Scientific Authoring Support: A Tool to Navigate in Typed Citation Graphs," Proceedings of the NAACL HLT 2010 Workshop on Computational Linguistics and Writing, pp. 7-14, Los Angeles, California, Jun. 2010.Association for Computational Linguistics.

* cited by examiner

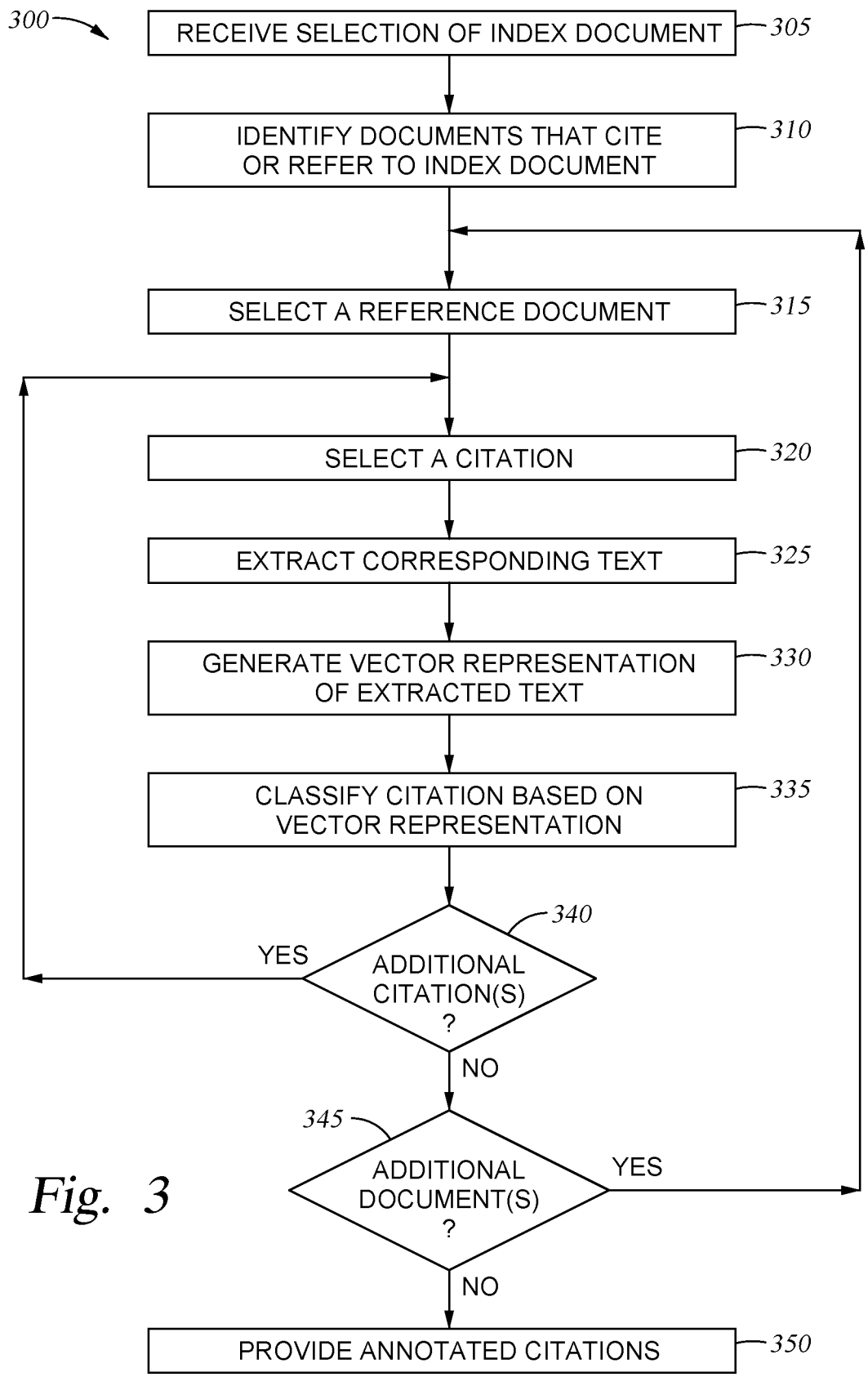

USE OF MACHINE LEARNING TO CHARACTERIZE REFERENCE RELATIONSHIP APPLIED OVER A CITATION GRAPH

BACKGROUND

The present disclosure relates to electronic document analysis, and more specifically, to analyzing and characterizing electronic documents using machine learning.

When reviewing academic publications, journals, and conference proceedings, readers are frequently interested in exploring related works and publications to any given article. Often, users utilize citations included in each paper in order to identify other related papers which may be used to expand the user's understanding of the subject matter and the papers themselves. Additionally, users may wish to locate documents that cite or refer to a particular document, in order to better understand the document and how it is situated in the field, and how the academic community has reacted to it. Typically, these references are organized based on the date they were published. However, the user cannot determine how these documents relate to the particular document without first reading each one, which is time and cost-prohibitive and prone to subjectivity and error. As such, it is very difficult for users to efficiently obtain an objective and granular understanding of how each document relates to the field.

SUMMARY

According to one embodiment of the present disclosure, a method is provided. The method includes receiving a selection of an index document, and identifying a plurality of documents that refer to the index document. For each respective document in the plurality of documents, the method includes extracting a respective portion of the respective document, wherein the respective portion refers to the index document, and generating, by operation of one or more processors, a respective vector representation for the respective portion. The method further includes generating a plurality of groupings for the plurality of documents based on how each of the plurality of documents relate to the index document, by processing the vector representations using a trained classifier. Finally, the method includes providing at least an indication of the plurality of groupings, along with the index document.

According to a second embodiment of the present disclosure, a computer-readable storage medium is provided. The computer-readable storage medium has program code embodied therewith, the computer-readable program code executable by one or more computer processors to perform an operation. The operation includes receiving a selection of an index document, and identifying a plurality of documents that refer to the index document. For each respective document in the plurality of documents, the operation includes extracting a respective portion of the respective document, wherein the respective portion refers to the index document, and generating, by operation of one or more processors, a respective vector representation for the respective portion. The operation further includes generating a plurality of groupings for the plurality of documents based on how each of the plurality of documents relate to the index document, by processing the vector representations using a trained classifier. Finally, the operation includes providing at least an indication of the plurality of groupings, along with the index document.

According to a third embodiment of the present disclosure, a system is provided. The system includes one or more computer processors, and a memory containing a program which when executed by the one or more computer processors performs an operation. The operation includes receiving a selection of an index document, and identifying a plurality of documents that refer to the index document. For each respective document in the plurality of documents, the operation includes extracting a respective portion of the respective document, wherein the respective portion refers to the index document, and generating, by operation of one or more processors, a respective vector representation for the respective portion. The operation further includes generating a plurality of groupings for the plurality of documents based on how each of the plurality of documents relate to the index document, by processing the vector representations using a trained classifier. Finally, the operation includes providing at least an indication of the plurality of groupings, along with the index document.

BRIEF DESCRIPTION OF THE SEVERAL VIEWS OF THE DRAWINGS

FIG. 3 is a flow diagram illustrating a method of analyzing and classifying electronic documents using machine learning, according to one embodiment disclosed herein.

DETAILED DESCRIPTION

Figure 1:
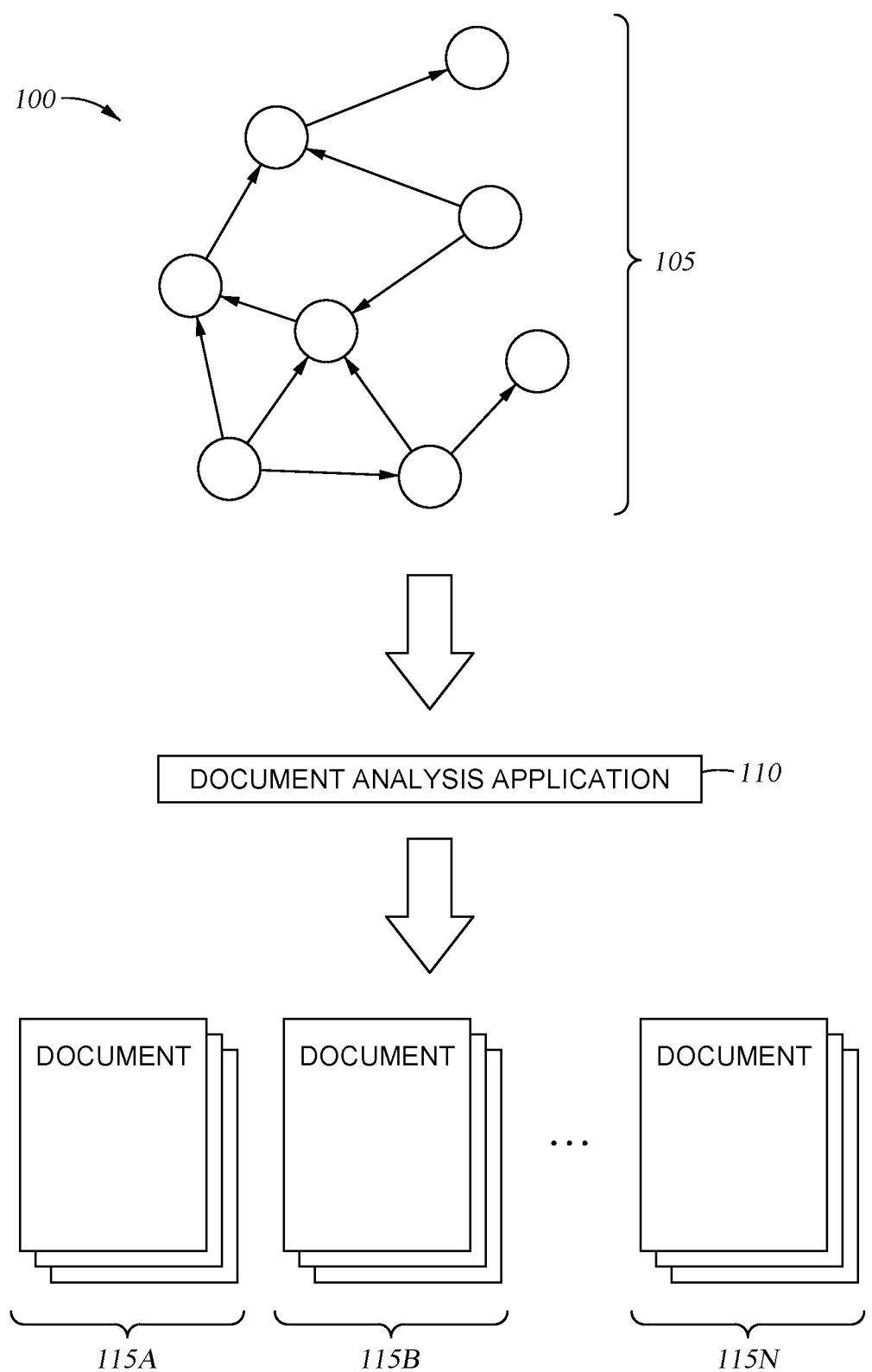
FIG. 1 illustrates a workflow for classifying electronic documents based on their relationship to an index document, according to one embodiment disclosed herein.

In embodiments of the present disclosure, a number of electronic textual documents are analyzed and classified using machine learning in order to determine relationships between the documents. In one embodiment, documents that refer to an index document are identified and analyzed to determine how they relate to the index document. The documents can then be classified based on this analysis, and the classifications can be provided to users in order to facilitate understanding. For example, in one embodiment, documents are classified based on whether they expand on the index document (e.g., building upon techniques used by the authors of the index document), criticize the index document (e.g., criticizing the methodology or techniques used), show similar findings or replicate the results of the index document (or fail to replicate the results), rely on the index document for support (e.g., refer to the index document as authoritative), or include corrections or improvements to the index document (e.g., prepared by the same authors or by others).

Embodiments of the present disclosure utilize machine learning to analyze and classify documents in a granular way that goes beyond merely classifying the document in terms of its positivity or negativity. In one embodiment, a citation graph is utilized to identify documents that relate to the index document. In embodiments, this citation graph may be provided (e.g., by the entity maintaining the corpus of documents), or may be generated dynamically. In some embodiments, only the portion of the graph that is relevant to the index document is analyzed (e.g., only the nodes and edges that are directly connected to the index document). In one embodiment, the analysis extends beyond this portion, and includes analysis of secondary and/or tertiary relationships.

In one embodiment, the citation graph is a directed graph, where each node corresponds to a document, and each edge corresponds to a reference or citation between documents. In embodiments of the present disclosure, a document can include an article, paper, journal, or any other textual document. In an embodiment, the directionality of each edge is determined based on which document refers to the other. For example, if a first document refers to and builds upon the work presented in a second document, the citation graph may include an edge from the first document to the second document. In some embodiments, the analysis includes explicit citations or references (e.g., by name or by some other identifier) between documents. In one embodiment, this analysis also extends to other references, including non-explicit references to the document (e.g., references that do not formally cite to the document).

In an embodiment, once the related documents for an index document are identified, all or a portion of the related documents is processed using a trained embedding model to generate a vector representation of the document (or portion thereof). In some embodiments, if a document includes multiple references to the index document, each reference is analyzed and separately, and a respective vector is generated for each reference in the document. In an embodiment, these vector representations are analyzed to generate groupings or clusters based on how they relate to the underlying index document. In one embodiment, a trained classifier (such as a support vector machine, a logistic regression model, one or more neural networks with linear activation, and the like) is used to classify each document into predefined categories, as discussed in more detail below. In some embodiments, one or more clustering algorithms are applied to enable a variable number of clusters to be identified (such as adaptive k-means clustering, density-based spatial clustering of applications with noise, and the like). In such an embodiment, unique categories of documents can be identified (rather than predefined classifications).

In some embodiments of the present disclosure, the generated groupings can be provided or indicated to the user, in order to enable deeper understanding of the underlying material. For example, in one embodiment, the number of documents in each category or classification is determined, and the user is provided with an indication as to the size of each category. In some embodiments, the categories are ranked or sorted based on the number of documents in each. In one embodiment, a link to each document is provided, along with at least a portion of the document (e.g., the portion surrounding the relevant citation or reference). Additionally, in some embodiments, the documents can be sorted or ranked within each category. For example, in some embodiments, the documents are arranged based on their publication date. In one embodiment, the reference documents are ranked based on how relevant they are to the index document. That is, in such an embodiment, the documents are analyzed to determine a level of importance the index document has for the reference document. For example, in one embodiment, the number of times each document cites or refers to the index document can be used to determine the importance of the index document, with respect to the reference document. Similarly, in some embodiments, the amount of text that refers to or discusses the index document is correlated to the importance score.

FIG. 1 illustrates a workflow 100 for classifying electronic documents based on their relationship to an index document, according to one embodiment disclosed herein. In the illustrated embodiment, a Citation Graph 105 is received by a Document Analysis Application 110. In some embodiments, the Citation Graph 105 is generated and provided to the Document Analysis Application 110 by a remote service. For example, in one embodiment, one or more services maintain corpora of documents and enable users to access them, search, read, purchase documents, and the like. In one embodiment, one or more of these services also generate and maintain a respective Citation Graph 105 for the documents they maintain. In some embodiments, the Document Analysis Application 110 receives these Citation Graph(s) 105 from one or more services.

In some embodiments, the Document Analysis Application 110 generates one or more Citation Graphs 105. In one embodiment, the Document Analysis Application 110 traverses one or more corpora of documents and generates Citation Graph(s) 105 based on the included citations and references. In some embodiments, the Document Analysis Application 110 receives Citation Graphs 105, and combines or links them as appropriate. For example, suppose an index document stored in a first corpora (which is included in a first Citation Graph 105), is referred or cited by a second document stored in a second corpora (and therefore included in a second Citation Graph 105). In one embodiment, the Document Analysis Application 110 can link these two graphs (e.g., by adding an edge from the second document in the second citation graph to the index document in the first citation graph), in order to generate a broader and more complete Citation Graph 105.

In the illustrated embodiment, the Document Analysis Application 110 analyzes the Citation Graph 105 to identify documents that relate to an index document (e.g., by referring to or citing to the index document). In some embodiments, the Document Analysis Application 110 performs this analysis for each document in the corpora. In one embodiment, the Document Analysis Application 110 receives a selection or indication of an index document (e.g., selected or opened by a user), and identifies the documents related to this selected document. As illustrated, the Document Analysis Application 110 categorizes the related documents into a number of Categories 115A-N, based on the nature of their relationship to the index document. In one embodiment, the appropriate Category 115A-N for a particular document is determined based on whether the document supports the index document, refutes it, expands on it, and the like. This curated set of reference documents can then be provided to a user.

Figure 2:
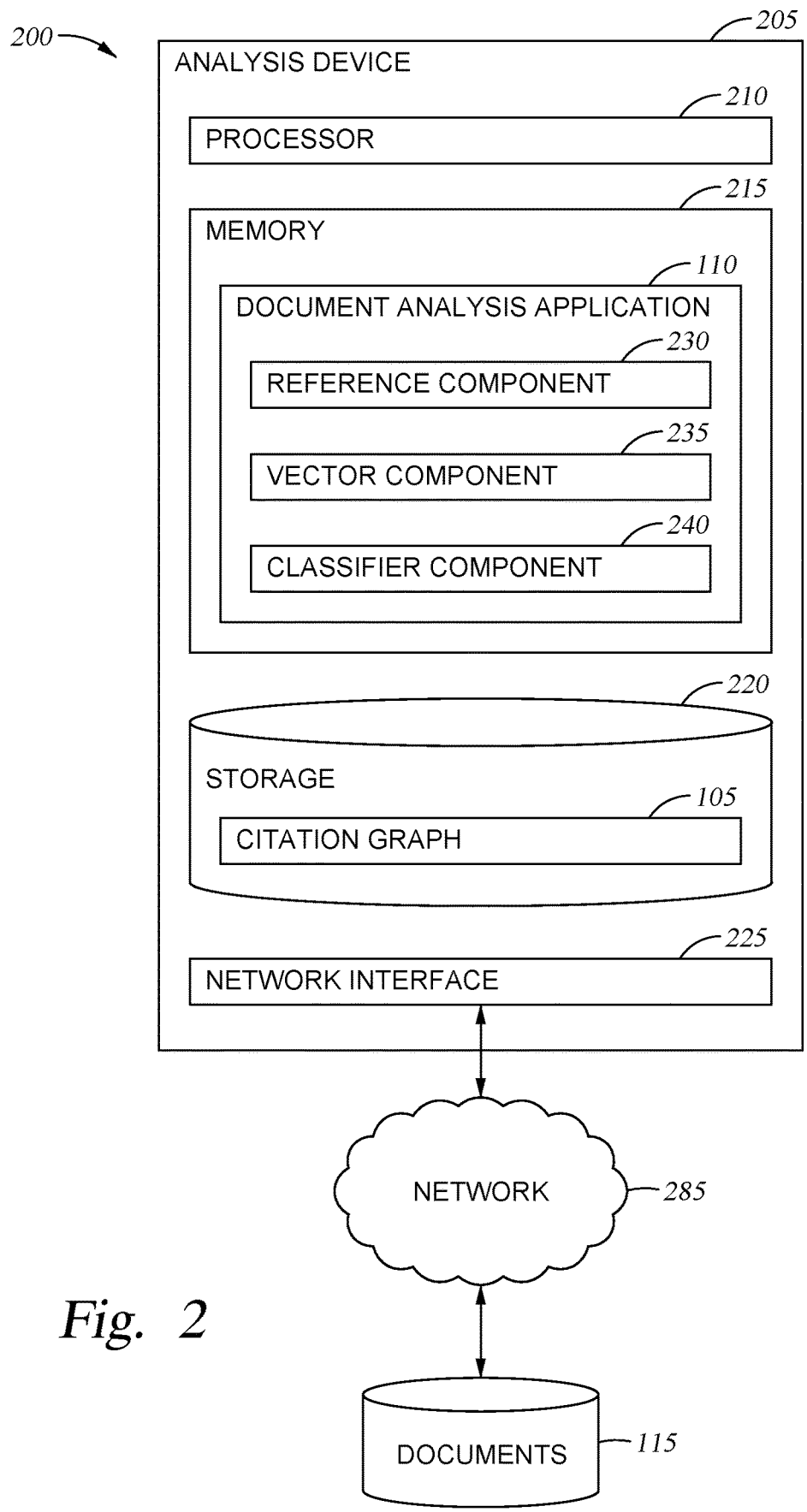
FIG. 2 is a block diagram illustrating an analysis device configured to analyze and classify electronic documents, according to one embodiment disclosed herein.

FIG. 2 is a block diagram illustrating an Analysis Device 205 configured to analyze and classify electronic documents, according to one embodiment disclosed herein. In the illustrated embodiment, the Analysis Device 205 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory.

Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Controller 110 can be communicatively coupled with other devices, such as document corpora, user devices, and the like. One skilled in the art will appreciate that one or more components of Analysis Device 205 may be located remotely and accessed via a network.

As illustrated, the Analysis Device 205 communicates with a corpus of Documents 115 via the Network 285. In one embodiment, the Network 285 is the Internet. Although a single store of Documents 115 is illustrated, in embodiments, the Analysis Device 205 can be communicatively with any number of devices, databases, entities, and storage media in order to retrieve Documents 115. In the illustrated embodiment, the Storage 220 includes a Citation Graph 105. Although a single Citation Graph 105 is illustrated, in embodiments, the Analysis Device 205 may rely on any number of Citation Graphs 105. Further, in one embodiment, the for a given index document, the Analysis Device 205 accesses, retrieves, or generates only the portion of the Citation Graph 105 that surrounds the index document (e.g., the nodes that are immediately adjacent to the index document in the graph and/or nodes that reference the index document). Additionally, although illustrated as residing in Storage 220, in embodiments, the Citation Graph 105 may reside in any appropriate location, including with the corpus of Documents 115 (e.g., provided by a separate entity).

In the illustrated embodiment, the Memory 215 includes a Document Analysis Application 110, which receives and analyzes Documents 115. As illustrated, the Document Analysis Application 110 includes a Reference Component 230, a Vector Component 235, and a Classifier Component 240. Although illustrated as discrete components, in embodiments, the operations and functionality of the Reference Component 230, Vector Component 235, and Classifier Component 240 can be combined or divided across any number of components. Further, although illustrated as software components residing in Memory 215, in embodiments, the operations and functionality of the Reference Component 230, Vector Component 235, and Classifier Component 240 can be implemented using hardware, software, or a combination of hardware and software.

In an embodiment, the Reference Component 230 receives an index document (e.g., selected by a user) and identifies a set of documents that refer or cite to the index document at least once. In some embodiments, the Reference Component 230 parses the Citation Graph 105 to identify such documents. In one embodiment, the Reference Component 230 identifies documents that include an actual citation to the index document. In some embodiments, the Reference Component 230 identifies and retrieves documents that refer to the index document, even the absence of an explicit citation. For example, in one embodiment, for an index document by an author named "Rutherford," the Reference Component 230 may identify documents that state " . . . in Rutherford's recent work on the matter . . . " as relevant reference documents. In embodiments, this identification may be based on natural language processing, and may consider factors such as whether the documents are in the same field, whether the timeline is consistent (e.g., whether the Rutherford document could be considered "recent" to the reference document), and the like.

In some embodiments, once the Reference Component 230 identifies the relevant reference documents, the Reference Component 230 further identifies the relevant portion(s) of each document. For example, in an embodiment, if a single document refers to or cites to the index document five times, the Reference Component 230 identifies each of these five sections as separate relevant portions, citations, or references. In some embodiments, the Reference Component 230 extracts some portion of text surrounding each reference, in order to provide context to the reference. For example, in one embodiment, the Reference Component 230 extracts a predefined number of sentences before and/or after each reference. In some embodiments, the amount of text to extract (as well as whether to extract text from before the reference, after the reference, or both) is defined by the user.

In the illustrated embodiment, the Vector Component 235 receives these portion(s) of documents, and generates a vector representation for each based on a pre-trained word-embedding space. In one embodiment, the Vector Component 235 analyzes the entire reference document to generate this vector. In other embodiments, the Vector Component 235 analyzes the portion(s) of text identified and extracted for each reference, and generates a corresponding vector. In some embodiments, the Vector Component 235 generates a single aggregate vector for each reference document, based on each of the individual references or citations included in the document. For example, in one embodiment, if the reference cites to the index document in four different places, the Vector Component 235 aggregates these portions before generating a single vector representing the document's relationship to the index document. In some embodiments, the Vector Component 235 generates a vector for each portion, and aggregates these vectors to represent the document.

In some embodiments, a single document may be classified into multiple categories, based on the individual references it contains. For example, suppose a first section of the document questions the methodology used in an index document, and a second section confirms the same results as the index document. In some embodiments, the document will be tagged or associated with each category, with the tag being further associated with the appropriate portion of the document. In some embodiments that utilize a single representation for each reference document, the portions or vectors are aggregated to generate a unified score, which is used to classify the document based on its overall or average relevance or relationship with the index document.

As illustrated, the Classifier Component 240 receives these vector representations, and classifies or categorizes them based on the relationship between the reference document (or the corresponding portion of the reference document) to the index document. For example, in one embodiment, the Classifier Component 240 uses a trained classifier (e.g., a neural network) to label each reference or document appropriately. In one embodiment, the classifier is trained using labeled exemplars. For example, in an embodiment, during a training phase, the text (or a vector representation thereof) of a reference document (or a portion of a reference document) is provided to the model as input, while the desired label (e.g., the correct category) is provided as target output. This output can be propagated through the model to update or refine weights and connections within the machine learning model, in order to improve its results. After the training phase is complete, new documents are processed (e.g., the vector representation for a document or portion of text) is used as input, and the classifier generates a corresponding label for the input.

In some embodiments, the Classifier Component 240 sorts the documents (or portions thereof) predefined categories or classes. For example, in one embodiment, the categories can include (i) documents that build upon the techniques used in the index document; (ii) criticisms of the methodology used in the index document; (iii) documents that replicate the results of the index document; (iv) corrections or revisions related to the index document; (v) documents that expand on the index document's concepts or ideas; (vi) documents that fail to replicate or support the results of the index document; and (vii) documents that rely on the index document as authoritative. Of course, in embodiments, any number of categories may be utilized. Further, in some embodiments, the Classifier Component 240 may associate a given document with multiple categories, depending on the particular implementation. In some embodiments, rather than use predefined categories, the Classifier Component 240 utilizes one or more clustering algorithms to classify the documents (or portions) into a dynamic and variable number of clusters, as appropriate.

FIG. 3 is a flow diagram illustrating a method 300 of analyzing and classifying electronic documents using machine learning, according to one embodiment disclosed herein. The method 300 begins at block 305, where the Document Analysis Application 110 receives a selection or indication of an index document. For example, in one embodiment, a user may select an index document that they wish to review or read. In one embodiment, the selection of the index document is received by the Document Analysis Application 110 when the user accesses the citations or references that refer to the document (e.g., by clicking a link that leads to the related documents). In some embodiments, the Document Analysis Application 110 receives or retrieves the text of the index document. In one embodiment, the Document Analysis Application 110 retrieves or generates a citation graph (or a portion of a graph) based on the selected index document. The method 300 then proceeds to block 310.

At block 310, the Document Analysis Application 110 identifies one or more documents that cite to or refer to the index document. For example, in one embodiment, the Document Analysis Application 110 retrieves a citation graph from the entity that maintains, stores, or provides the index document. The Document Analysis Application 110 can then analyze the citation graph to determine the set of documents that refer or cite to the selected document. In another embodiment, the Document Analysis Application 110 retrieves the list of relevant documents from the providing entity. In some embodiments, as discussed above, the Document Analysis Application 110 identifies documents that explicitly cite to the index document, as well as documents (or portions of documents) that refer to the index document without an formal citation (e.g., without including a footnote).

The method 300 then proceeds to block 315, where the Document Analysis Application 110 selects a first reference document from the identified set of documents. At block 320, the Document Analysis Application 110 selects a first citation or reference included in the index document. That is, in the illustrated embodiment, the Document Analysis Application 110 identifies the location in the reference document of each of the one or more citations or references to the index document. The Document Analysis Application 110 then selects one of these references or citations for processing. The method 300 then continues to block 325, where the Document Analysis Application 110 extracts some portion of text from the reference document. As illustrated, the extracted portion of text corresponds to the selected citation. For example, in one embodiment, the Document Analysis Application 110 extracts the sentence that relates to the citation (e.g., that is associated with the footnote or other citation, or that makes the reference).

In one embodiment, the Document Analysis Application 110 also extracts a predefined number of sentences before and/or after the selected citation or reference. In some embodiments, if the reference is associated with a footnote, the Document Analysis Application 110 also extracts text included within the footnote (e.g., if the authors provided additional explanation or clarification in the footnote). In one embodiment, the Document Analysis Application 110 analyzes the text using one or more natural language processing (NLP) techniques to determine how much text to extract. For example, in such an embodiment, the Document Analysis Application 110 an determine, beginning with the sentence immediately prior or subsequent to the sentence containing the reference or citation, whether it is relevant or related to the reference or citation. In this way, the Document Analysis Application 110 can identify the relevant portion of text by expanding outwards away from the reference sentence, until the next sentence is no longer relevant or related to the citation (or until the confidence that the sentence is relevant falls below a predefined threshold).

The method 300 then proceeds to block 330, where the Document Analysis Application 110 generates a vector representation of the extracted text. In one embodiment, the Document Analysis Application 110 utilizes a pre-trained word embedding space, as discussed in more detail below with reference to FIGS. 4A and 4B. In an embodiment, the vector representation is a multi-dimensional vector (or a one-dimensional array) of floating point numbers, and may be any length (e.g., may have any number of components). In embodiments, the vector representation of the portion of text enables the text to be objectively placed in a word-embedding space, which enables objective classification of the text based on its meaning or context.

At block 330, the Document Analysis Application 110 classifies the selected citation or reference based on the generated vector representation. In one embodiment, the Document Analysis Application 110 utilizes a machine learning model that has been trained using labeled exemplars. For example, in an embodiment, the classifier was trained by providing a vector as input, and applying an indication of a category or classification as the target output (such as using a one-hot vector). This target output can then be back-propagated through the model, in order to modify weights and connections within the machine learning model to better predict the correct classification. In one embodiment, the Document Analysis Application 110 utilizes labeled exemplars (e.g., labeled by one or more humans or subject matter experts) to train or refine the classifier model(s). Once the model(s) are trained, the Document Analysis Application 110 processes the generated vector for a given portion of text as the input to the model, and determines which category or categories the reference belongs in.

In other embodiments, as discussed above, the Document Analysis Application 110 instead utilizes unsupervised models such as adaptive k-means clustering in order to generate the categories. In such an embodiment, the Document Analysis Application 110 may refrain from classifying the generated vector until all of the relevant citations or references have been processed to generate corresponding vectors. At this time, the Document Analysis Application 110 can apply the clustering algorithm(s) to the set of vector representations, in order to generate the groupings.

The method 300 then proceeds to block 340, where the Document Analysis Application 110 determines whether there is at least one additional citation or reference remaining in the selected reference document that has yet to be processed. If so, the method 300 returns to block 320, to select the next citation or reference. Otherwise, the method 300 proceeds to block 345, where the Document Analysis Application 110 determines whether there is at least one additional reference document yet to be analyzed. In some embodiments, as discussed above, the Document Analysis Application 110 may also generate a collective or aggregate vector representation and/or classification(s) for the selected reference document, based on the individual references. In such an embodiment, the Document Analysis Application 110 can generate this label prior to proceeding to block 345.

If, at block 345, it is determined that there is at least one additional reference document to be analyzed, the method 300 returns to block 315, where the Document Analysis Application 110 selects the next document. Otherwise, the method 300 proceeds to block 350, where the Document Analysis Application 110 provides annotated citations based on the analysis and classification. For example, in one embodiment, the Document Analysis Application 110 sorts the reference documents based on the generated classification, and the user is presented with the groupings or clusters of documents for review. In some embodiments, the groupings are labeled based on the relationship between the corresponding reference documents and the index document (e.g., whether they support the index document, contradict it, and the like). In one embodiment, the categories are sorted based on the number of documents contained in each.

In some embodiments, the Document Analysis Application 110 provides some or all of the identified and extracted portion(s) of text from each document, in order to allow the user to quickly review the reference prior to requesting the entire document. In one embodiment, the Document Analysis Application 110 also provides a link or pointer to the corresponding reference document, which enables the user to request the full text of the reference document. In some embodiments, the references or citations included within a single reference document are grouped together in the annotated results, so that they can be easily accessed together.

In one embodiment, the Document Analysis Application 110 sorts the documents based on their relevance or importance to the index document. For example, in one embodiment, the documents are arranged or sorted based at least in part on their respective publication dates (e.g., with more recent documents nearer to the top of the results). In some embodiments, the Document Analysis Application 110 determines, for each reference document, a number of times that the document refers or cites to the index document. In one embodiment, the number of times the document refers to the index document represents the importance of the index document, with respect to the reference document. Similarly, in one embodiment, the Document Analysis Application 110 determines the amount of text that is relevant to the index document (e.g., the number of sentences that were extracted from the reference document to generate the vector representation(s)). The amount of sentences or length of those sentences can also be used to represent the importance of the index document to the reference document, in some embodiments. In an embodiment, the documents are further sorted or arranged based on this determined importance.

Figure 4A:
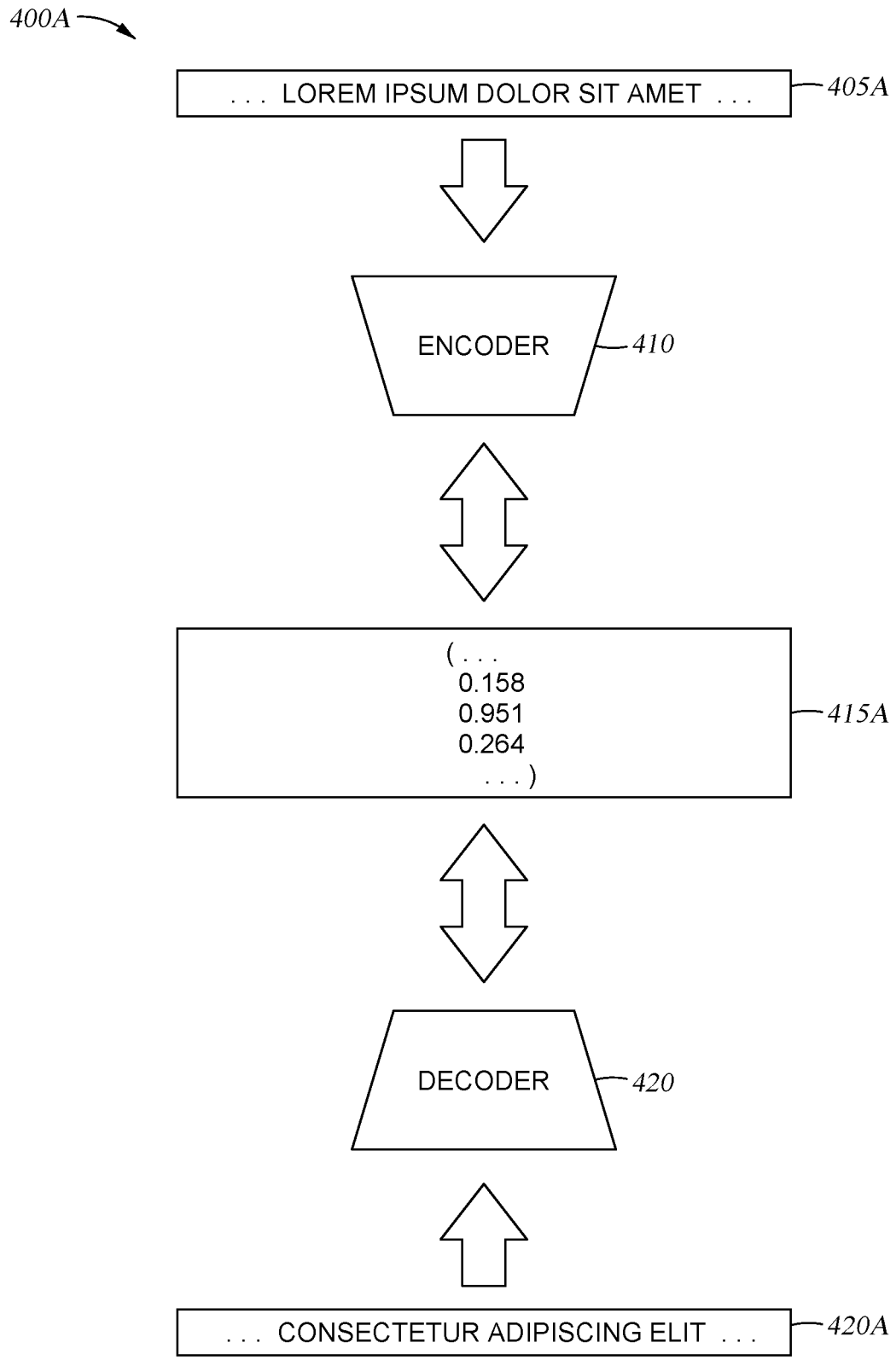
FIG. 4A illustrates a workflow for training a word embedding encoder to analyze electronic documents, according to one embodiment disclosed herein.

FIG. 4A illustrates a workflow 400A for training a word embedding encoder to analyze electronic documents, according to one embodiment disclosed herein. In the illustrated embodiment, a block of Text 405A is provided as input to an Encoder 410. As illustrated by the ellipses, in embodiments, the Text 405A may be any length. In an embodiment, the Text 405A corresponds to a reference or citation to a document. For example, the Text 405A may include discussion of another document, such as "the methodology used by Anderson et al. can be expanded on in several ways." As illustrated, the Encoder 410 processes this Text 405A to generate a Vector 415A, which is a one-dimensional array (or multidimensional vector) of floating point numbers.

In the illustrated embodiment, in order to train the Encoder 410, a Decoder 420 is trained to receive Vectors 415A and generate some output. In one embodiment, the target output of the Decoder 420 is the Context 420A of the input Text 405A (e.g., the text that surrounds the Text 405A in the original reference document). Of course, any context or data can be used as the target output, as long as the target output can be used to generate or understand the meaning of the input Text 405A. As illustrated, this Context 420A is propagated through the Decoder 420 and into the Encoder 410, in order to train the Encoder 410. In the illustrated embodiment, the training process is repeated for a number of exemplars, in order to train both the Encoder 410 and the Decoder 420. Specifically, the Encoder 410 is trained to generate a Vector 415A that represents the input Text 405A, and the Decoder 420 is trained to decode this Vector 415A into the appropriate Context 420A. In some embodiments, once the Encoder 410 has been trained to generate the vector representations, the Decoder 420 is discarded.

Figure 4B:
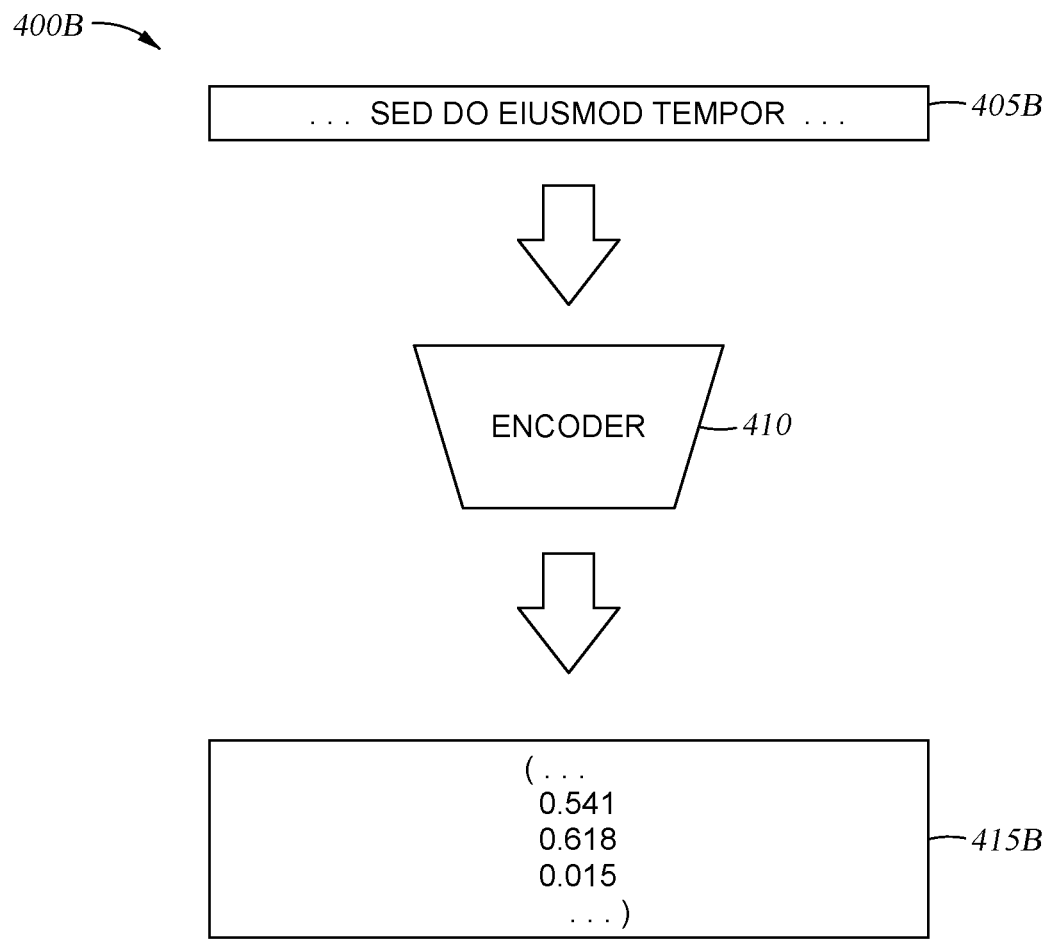
FIG. 4B illustrates a workflow for using a trained word embedding encoder to analyze electronic documents, according to one embodiment disclosed herein.

FIG. 4B illustrates a workflow 400B for using a trained word embedding encoder to analyze electronic documents, according to one embodiment disclosed herein. In the illustrated embodiment, the Encoder 410 has been trained, and the Decoder 420 is discarded. As illustrated, in use, the Document Analysis Application 110 provides a segment of Text 405B to the Encoder 410, which generates a corresponding Vector 415B. As discussed above, in embodiments, this Vector 415B can be used to locate the Text 405B in the embedding space, such that it can be easily and objectively compared to other text, and classified based on its intent and meaning.

Figure 5:
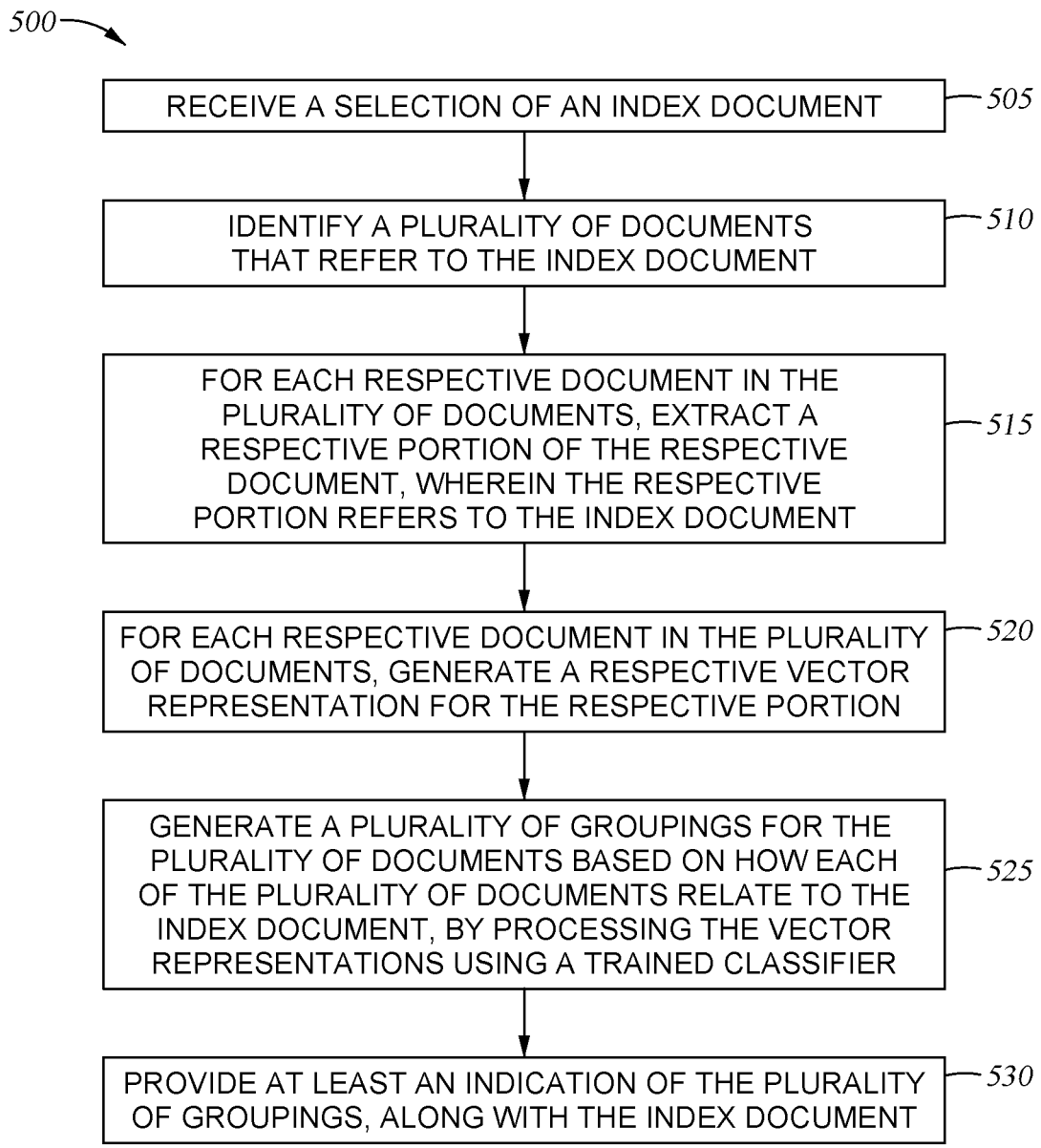
FIG. 5 is a flow diagram illustrating a method of analyzing and classifying electronic documents, according to one embodiment disclosed herein.

FIG. 5 is a flow diagram illustrating a method 500 of analyzing and classifying electronic documents, according to one embodiment disclosed herein. The method 500 begins at block 505, where the Document Analysis Application 110 receives a selection of an index document. At block 510, the Document Analysis Application 110 identifies a plurality of documents that refer to the index document. The method 500 then proceeds to block 515, where, for each respective document in the plurality of documents, the Document Analysis Application 110 extracts a respective portion of the respective document, wherein the respective portion refers to the index document. Further, at block 520, the Document Analysis Application 110 generates, for each respective document in the plurality of documents, a respective vector representation for the respective portion. The method 500 continues to block 525, where the Document Analysis Application 110 generates a plurality of groupings for the plurality of documents based on how each of the plurality of documents relate to the index document, by processing the vector representations using a trained classifier. Finally, at block 530, the Document Analysis Application 110 provides at least an indication of the plurality of groupings, along with the index document.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Document Analysis Application 110) or related data available in the cloud. For example, the Document Analysis Application 110 could execute on a computing system in the cloud and analyze documents and citation graphs. In such a case, the Document Analysis Application 110 could determine the relationships between documents, and store the resulting labels at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a selection of an index document;
   identifying a plurality of documents that refer to the index document;
   for each respective document in the plurality of documents:
      extracting a respective portion of the respective document, wherein the respective portion refers to the index document; and
      generating, by operation of one or more processors, a respective vector representation for the respective portion;
   generating a plurality of groupings for the plurality of documents based on how each of the plurality of documents relate to the index document, comprising, for each respective document in the plurality of documents:
      processing the respective vector representation using a trained classifier to assign the respective document to a respective category of a plurality of categories, wherein the plurality of categories includes (i) a category for documents that support the index document, and (ii) a category for documents that do not support the index document; and
   providing at least an indication of the plurality of groupings, along with the index document.

2. The method of claim 1, wherein the trained classifier is trained using a curated training set of documents, wherein each respective document in the curated training set is labeled based on how it relates to a respective reference document.

3. The method of claim 1, wherein identifying the plurality of documents that refer to the index document comprises:
   identifying documents that cite the index document; and
   identifying documents that refer to the index document without explicitly citing the index document.

4. The method of claim 1, wherein extracting the respective portion of each respective document comprises:
   identifying a location in the respective document where the index document is referenced; and
   extracting a predefined number of sentences before and after the identified location.

5. The method of claim 1, wherein each of the plurality of groupings correspond to a respective category of a plurality of categories, wherein the plurality of categories further includes at least one of:
   (i) a category for documents expanding on the index document;
   (ii) a category for documents criticizing the index document;
   (iii) a category for documents showing similar findings as the index document;
   (iv) a category for documents that failed to show similar findings as the index document; or
   (v) a category for documents that rely on the index document for support.

6. The method of claim 1, the method further comprising:
   providing a number of documents that are included in each of the plurality of groupings;
   providing a link to each of the plurality of documents; and providing the respective portion of each respective document in the plurality of documents.

7. The method of claim 1, wherein the documents included in a first category of the plurality of groupings are sorted based in part on a respective importance measure of each respective document.

8. The method of claim 1, wherein identifying the plurality of documents that refer to the index document comprises accessing a citation graph that includes the index document.

9. A computer-readable storage medium having computer-readable program code embodied therewith, the computer-readable program code executable by one or more computer processors to perform an operation comprising:
   receiving a selection of an index document;
   identifying a plurality of documents that refer to the index document;
   for each respective document in the plurality of documents:
      extracting a respective portion of the respective document, wherein the respective portion refers to the index document; and
      generating a respective vector representation for the respective portion;
   generating a plurality of groupings for the plurality of documents based on how each of the plurality of documents relate to the index document, comprising, for each respective document in the plurality of documents:
      processing the respective vector representation using a trained classifier to assign the respective document a respective category of a plurality of categories, wherein the plurality of categories includes (i) a category for documents that support the index document, and (ii) a category for documents that do not support the index document; and
   providing at least an indication of the plurality of groupings, along with the index document.

10. The computer-readable storage medium of claim 9, wherein the trained classifier is trained using a curated training set of documents, wherein each respective document in the curated training set is labeled based on how it relates to a respective reference document.

11. The computer-readable storage medium of claim 9, wherein identifying the plurality of documents that refer to the index document comprises:
   identifying documents that cite the index document; and
   identifying documents that refer to the index document without explicitly citing the index document.

12. The computer-readable storage medium of claim 9, wherein extracting the respective portion of each respective document comprises:
   identifying a location in the respective document where the index document is referenced; and
   extracting a predefined number of sentences before and after the identified location.

13. The computer-readable storage medium of claim 9, wherein each of the plurality of groupings correspond to a respective category of a plurality of categories, wherein the plurality of categories further includes at least one of:
   (i) a category for documents expanding on the index document;
   (ii) a category for documents criticizing the index document;
   (iii) a category for documents showing similar findings as the index document;
   (iv) a category for documents that failed to show similar findings as the index document; or
   (v) a category for documents that rely on the index document for support.

14. The computer-readable storage medium of claim 9, the operation further comprising:
   providing a number of documents that are included in each of the plurality of groupings;
   providing a link to each of the plurality of documents; and
   providing the respective portion of each respective document in the plurality of documents.

15. A system comprising:
   one or more computer processors; and
   a memory containing a program which when executed by the one or more computer processors performs an operation, the operation comprising:
      receiving a selection of an index document;
      identifying a plurality of documents that refer to the index document;
      for each respective document in the plurality of documents:
         extracting a respective portion of the respective document, wherein the respective portion refers to the index document; and
         generating a respective vector representation for the respective portion;
      generating a plurality of groupings for the plurality of documents based on how each of the plurality of documents relate to the index document, comprising, for each respective document in the plurality of documents:
         processing the respective vector representation using a trained classifier to assign the respective document a respective category of a plurality of categories, wherein the plurality of categories includes (i) a category for documents that support the index document, and (ii) a category for documents that do not support the index document; and
      providing at least an indication of the plurality of groupings, along with the index document.

16. The system of claim 15, wherein the trained classifier is trained using a curated training set of documents, wherein each respective document in the curated training set is labeled based on how it relates to a respective reference document.

17. The system of claim 15, wherein identifying the plurality of documents that refer to the index document comprises:
   identifying documents that cite the index document; and
   identifying documents that refer to the index document without explicitly citing the index document.

18. The system of claim 15, wherein extracting the respective portion of each respective document comprises:
   identifying a location in the respective document where the index document is referenced; and
   extracting a predefined number of sentences before and after the identified location.

19. The system of claim 15, wherein each of the plurality of groupings correspond to a respective category of a plurality of categories, wherein the plurality of categories further includes at least one of:
   (i) a category for documents expanding on the index document;
   (ii) a category for documents criticizing the index document;
   (iii) a category for documents showing similar findings as the index document;

(iv) a category for documents that failed to show similar findings as the index document; or (v) a category for documents that rely on the index document for support.

20. The system of claim 15, the operation further comprising:

providing a number of documents that are included in each of the plurality of groupings;

providing a link to each of the plurality of documents; and providing the respective portion of each respective document in the plurality of documents.

* * * * *